US010778519B2

(12) United States Patent
Vuggrala et al.

(10) Patent No.: US 10,778,519 B2
(45) Date of Patent: Sep. 15, 2020

(54) INTELLIGENT UPGRADES FOR NETWORK DEVICES

(71) Applicant: Hewlett Packard Enterprise Development LP, Houston, TX (US)

(72) Inventors: Shravan Kumar Vuggrala, Bangalore (IN); Srinivas Rao Killadi, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 72 days.

(21) Appl. No.: 16/113,070

(22) Filed: Aug. 27, 2018

(65) Prior Publication Data
US 2020/0067770 A1 Feb. 27, 2020

(51) Int. Cl.
*H04L 12/24* (2006.01)
*H04L 12/26* (2006.01)
*H04W 24/08* (2009.01)
*H04W 84/12* (2009.01)

(52) U.S. Cl.
CPC .......... *H04L 41/0816* (2013.01); *H04L 43/16* (2013.01); *H04W 24/08* (2013.01); *H04W 84/12* (2013.01)

(58) Field of Classification Search
CPC ... H04L 41/0816; H04L 43/16; H04L 41/082; H04L 45/028; H04L 45/563; H04W 24/08
See application file for complete search history.

(56) References Cited

U.S. PATENT DOCUMENTS 8,855,087 B2 * 10/2014 Banerjee ............. H04L 67/1095 370/338
9,483,248 B2 * 11/2016 Ramasamy ............. G06F 8/656
9,792,110 B2 * 10/2017 Baset ..................... G06F 8/656
10,440,590 B2 * 10/2019 Knapp ................ H04L 41/0816
2008/0084855 A1 * 4/2008 Rahman ................ H04W 24/04 370/342
2014/0258479 A1 9/2014 Tenginakai et al.
2015/0373561 A1 * 12/2015 Huang .................. H04L 41/082 370/252
2019/0380048 A1 * 12/2019 Desai .................... H04W 24/02

FOREIGN PATENT DOCUMENTS

WO WO-2016019856 A1 2/2016

OTHER PUBLICATIONS

Gerend, J., "Cluster-Aware Updating overview," Mar. 23, 2017, https://docs.microsoft.com/en-us/windows-server/failover-clustering/cluster-aware-updating.

* cited by examiner

*Primary Examiner* — Chi H Pham
*Assistant Examiner* — Weibin Huang
(74) *Attorney, Agent, or Firm* — Brooks, Cameron & Heubsch, PLLC

(57) ABSTRACT

An example of a system may include a controller to monitor network parameters in a wireless local area network (WLAN), the controller may include a processing resource and a memory resource including instructions executable by the processing resource to analyze network parameters in the WLAN over a period of time, determine a threshold for the network parameters, determine a plurality of time intervals based on an upgrade to be applied to the WLAN, identify when the network parameters of the WLAN are below the determined threshold, and initiate the upgrade to the WLAN when the network parameters are below the determined threshold where the upgrade is performed during one of the plurality of time intervals.

18 Claims, 5 Drawing Sheets

INTELLIGENT UPGRADES FOR NETWORK DEVICES

BACKGROUND

Networking devices may send and/or receive data within a computing network. Upgrades to the network may be applied to the network in order to upgrade the performance, reliability, and/or security of the network. Applying the upgrades to the network may interrupt network performance.

DETAILED DESCRIPTION

Figure 1:
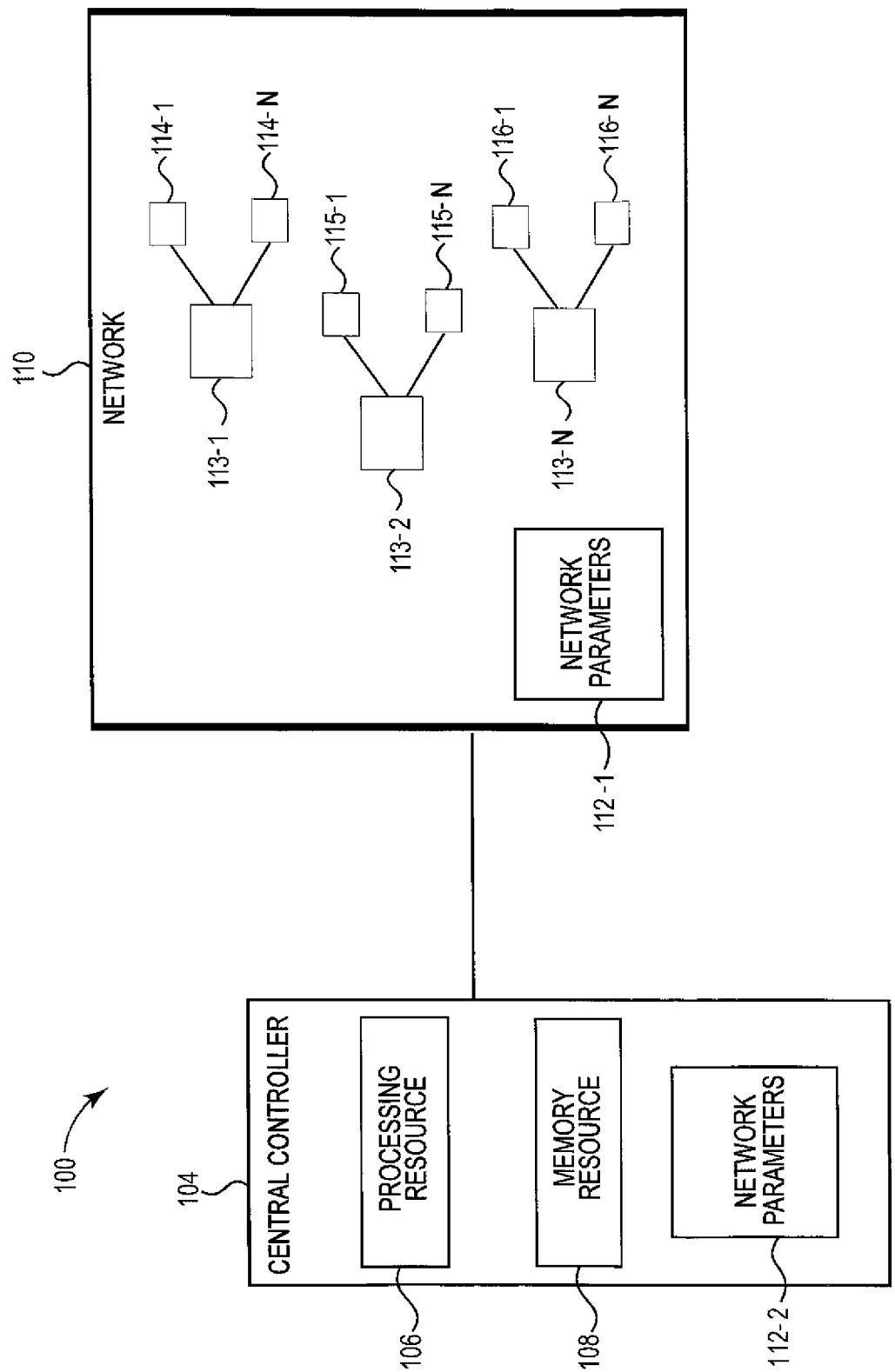
FIG. 1 illustrates an example of a system for network upgrades consistent with the disclosure.

Upgrades to the network devices may be applied to a network (e.g., a wireless network) in order to upgrade the performance, reliability, and/or security of the network. Applying the upgrades to the network may interrupt network performance. Multiple parameters of a wireless network may be considered to determine a time to upgrade the network devices to cause the least amount of interruption. The consideration of the multiple parameters may be complex and difficult to accomplish manually.

As used herein, a network device may include a computing device that is adapted to transmit and/or receive signaling and to process information within such signaling across a network. For example, a network device may include, a controller, a client device, a node, an access point, and/or a data transfer device, etc.

As used herein, a client device may include a computing device including hardware and/or a combination of hardware and instructions executable by the hardware to access and/or communicate with the network and/or other network devices on the network. For example, a client device may include data processing equipment such as a computer, cellular phone, personal digital assistant, tablet devices, etc.

As used herein, an Access Point (AP) may include a computing device including hardware and/or a combination of hardware and instructions executable by the hardware to operate as a transmitter and/or a receiver of signals between a client device, other access points, a controller, and/or other network devices on the network. In some examples, an AP may act as a transmitter and/or receiver of wireless radio signals for known or convenient wireless access technology which may later become known. While the term AP may include network devices that transmit and/or receive IEEE 802.11-based Wi-Fi signals, AP is not limited to IEEE 802.11-based APs. APs may function as an electronic device that is adapted to allow wireless computing devices, such as client devices, to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces and/or 802.15 interfaces, although examples of the disclosure are not limited to such interfaces. An AP can include a memory resource, including read-write memory, and a hierarchy of persistent memory such as ROM, EPROM, and Flash memory.

As used herein, a data transfer device may include a computing device including hardware and/or a combination of hardware and instructions executable by the hardware to operate as an intermediary device for coordinating the transfer of data between network device across a network and/or to other networks. For example, a data transfer device may include network switches, routers, controllers, etc.

In some examples, multiple network devices (e.g., access points) may be grouped together in a same network. As such, the APs may work together to provide network coverage and/or data communication across the network. The multiple APs may be controlled by a controller and/or a plurality of controllers (e.g., a node or a plurality of nodes). For example, an interconnected collection of a plurality of controllers may be utilized to control and move clients among APs in the network and/or APs between controllers of the plurality of controllers. For example, a network may include a plurality of nodes that may be able to redundantly perform a same task. As used herein, the term "node" refers to a network device to perform a specific function and may include a controller and a set of APs. In some examples, a node may include a controller with several APs connected to the controller included on the node. Each node may include a controller and a set of APs and may be running its own instance of executable instructions and each node may utilize similar or identical hardware. The controller and/or controllers of the network may operate to distribute and/or coordinate data traffic, APs, data load, and/or clients across the various nodes. In some examples, a central controller may coordinate the activities of the plurality of controllers included on each node.

Upgrades may be occasionally applied to the network. As used herein, the term "upgrade" refers to a modification to the hardware, the executable instructions, and/or a combination of the hardware and the executable instructions of the network devices. The modification may include changes to the network devices to upgrade the performance, reliability, and/or security of the network. In some examples, upgrading a network (e.g., a WLAN) may include retrieving, communicating, installing, and/or applying a new version or image of software, firmware, operating system, network settings, etc. for a portion of the network devices.

Upgrading the network may utilize computing resources of the network devices and/or interrupt the function of the network devices during the upgrade. For example, during a network upgrade a network device may not provide connectivity to the network and/or data communication across the network. As such, connectivity and/or data communication across the network may be interrupted, degraded, slowed, and/or discontinued during the upgrade. For example, a client device may lose its connection to the network, may experience dropped packets, may experience slowing of data transmission, and/or may experience an interrupted or dropped session. Such interruptions may disrupt client sessions, aggravate clients, and/or damage a reputation of an enterprise and/or institution providing data service with the network.

In some examples, network administrators may determine a time to perform and upgrade and may send a message to clients warning of potential network outages, interruptions, and/or slowdowns during the time period. However, manually considering multiple metrics of multiple network parameters to determine a time to perform an upgrade may be cumbersome and difficult. While determining a time to provide an update and providing such messages may provide clients an opportunity to schedule their session accordingly, the interruption may still be an undesirable happening to the clients. Further, in some examples, an upgrade to a network may interrupt the activity of network devices for a period of time, such as an hour, which may pose an unacceptable loss of productivity to the clients and/or to an enterprise and/or institution providing data service with the network. Furthermore, interrupting the activity of the network devices during particular time windows of the day may be more impactful than others. For example, a network upgrade that interrupts the activity of the network devices for one hour may be far more harmful in the middle of the work day verses in the middle of the night. As such, network administrators may attempt to determine a time interval to perform an upgrade by analyzing multiple network parameters and manually choosing a time window to apply the upgrade. Thus, the administrator may make errors and/or assumptions about when is the best time window to apply an upgrade and/or interrupt the activity of network devices and the service provided by the network. Such assumptions may not accurately account for the actual network conditions during that time window and analyzing multiple network parameters is difficult and error prone when attempted manually.

In contrast, examples of the present disclosure may analyze multiple network parameters of multiple network devices (e.g., APs, a cluster of network devices, controllers, nodes, etc.) within a network (e.g., a WLAN) over a period of time to determine when the activity of the network devices are low, thus an upgrade may be less impactful when compared to the activity of the network devices being relatively high. Based on the analyzed network parameters, time intervals corresponding to a determined threshold of the network parameters may be determined.

As used herein, the term "threshold" refers to a level of network parameters which may be suitable for the application of an upgrade. For example, the threshold of network parameters may be selected by analyzing the network parameters over a period of time and comparing the level of network parameters during multiple intervals of time to determine when the network is operating at a relative low. For example, analyzed network parameters determined to be at or below the threshold may indicate the activity of the network devices are relatively low when compared to the analyzed network parameters being above the threshold thus indicating that the analyzed network parameters are relatively high. Thus, an upgrade may be initiated to the network during a time interval when the analyzed network parameters fall below the threshold.

For example, the upgrade may be scheduled to be applied to the network during the time interval when the network parameters are predicted to be low, and a controller (e.g., a central controller) may analyze the network parameters at the predicted time interval to check that the network parameters are actually below the determined threshold. In other words, a time interval to apply an upgrade may be predicted based on when the network parameters have historically been at a relative low, and the upgrade may be applied during that time interval when the network parameters are determined to be below the threshold. Therefore, instead of a network administrator attempting to analyze multiple network parameters, and/or an upgrade being applied to a network when the network parameters are high (even at a time when the network parameters are predicted to be high), examples herein may utilize a data-driven approach to observing network parameters and identifying whether the network parameters are at or below a determined threshold and performing an upgrade at a time where an amount and/or type of data traffic in the network may be at a relative low. In this way, disruption to the network may be avoided. In other words, examples described herein allow for the analysis for a prediction of a time interval to perform an upgrade and for the ability to check, during the predicted time interval, whether the network parameters are actually low.

FIG. 1 illustrates a system 100 for network upgrades consistent with the disclosure. The system 100 may include, a central controller 104, which may include a processing resource 106, and a memory resource 108. The central controller 104 may be in communication with a network 110 (e.g., a WLAN) which may include, a plurality of nodes 113-1, 113-2, ... 113-N (e.g., a cluster of network devices), which may be collectively referred to as nodes 113 and/or the plurality of nodes 113. Each node of the plurality of nodes 113 may include a controller to monitor and/or manage the activities of a set of network devices 114-1, .. . 114-N, 115-1, ..., 115-N, and 116-1, ... 116-N, which may be referred to collectively as the network devices 114, 115, and/or 116. As illustrated in FIG. 1, each node 113 may be wired and/or wirelessly connected to the plurality of network devices 114, 115, and 116. The network 110 may include network parameters 112-1 of the plurality of nodes 113. As illustrated in FIG. 1, the network parameters 112-1 may be the network parameters 112-1 of the network 110, and the network parameters 112-2 are illustrated on the central controller 104 to illustrate the analysis and/or evaluation of the network parameters 112-1 by the central controller 104. As used herein, for clarity and as to not obscure the examples of the disclosure, the network parameters 112-1 and 112-2 may be collectively referred to as the network parameters 112.

As used herein, the term "central controller" refers to a network device such as a controller that may be utilized to monitor and/or manage the activities of the other controllers and/or network devices on the network 110. For example, the central controller 104 may monitor and/or manage the plurality of nodes 113 and the controllers and network devices 114, 115, 116 associated with each node of the plurality of nodes 113. The central controller 104 may collect, monitor, and/or analyze the network parameters 112 of the plurality of nodes 113 to determine when a network upgrade should be applied to the nodes 113 of the network 110.

As used herein, the term "network parameter" refers to multiple metrics of the nodes 113 of the network 110. For example, the network parameters 112 may be metrics of the nodes 113 of the network 110 such as load distribution of the nodes 113 (e.g., APs and clients over a period of time), the traffic pattern of the nodes 113 within the network 110, the network utilization of the nodes 113 over a period of time, and/or the types of applications (e.g., real-time transport protocol (RTP), file transfer protocol (FTP), etc.) used on the network over a period of time. Another example of the network parameters 112 may be the core usage of the controllers included in the nodes 113 of the network 110. As used herein, the term "core usage" may refer to the percentage of central processing unit (CPU) utilized by the network, the memory usage of the controllers of the network, the radio frequency (RF) density, and/or the data path sessions on each of the controllers included in the nodes 113 of the network 110. Multiple network parameters 112 may be analyzed together to determine a threshold.

The central controller 104 may monitor the network parameters 112 to determine when the network parameters 112 are relatively low. For example, the network parameters 112 may be relatively low when the activity of the nodes 113 included in the network 110 is low. In some examples, the central controller 104 may analyze, monitor, and determine data (e.g., network parameters 112) which may be received from the nodes 113 of the network 110. For example, the central controller 104 may aggregate the network parameter 112 data from each of the controllers included on the nodes 113 included in the network 110. For example, the central controller 104 may monitor the plurality of nodes 113 operating on the network 110 to determine a level of activity of the nodes 113. The central controller 104 may include the processing resource 106 (e.g., a hardware logic and/or an ASIC) and the memory resource 108 to execute instructions relating to network upgrades.

FIG. 1 illustrates the central controller 104 including the processing resource 106 and the memory resource 108. The processing resource 106 and may be central processing units (CPUs), semiconductor-based microprocessors, and/or other hardware devices suitable for retrieval and execution of instructions stored in a memory resource 108 (e.g., in a non-transitory computer readable medium). The example processing resource 106 may fetch, decode, and execute instructions. As an alternative, or in addition to, retrieving and executing instructions, the example processing resource 106 may include an electronic circuit that may include electronic components for performing the functionality of executed instructions.

In some examples, the processing resource 106 may be a plurality of hardware processing units that may cause machine-readable instructions to be executed. The processing resource 106 may include CPUs among other types of processing units. The memory resource 108 and may be any type of volatile or non-volatile memory or storage, such as random-access memory (RAM), flash memory, storage volumes, a hard disk, or a combination thereof.

FIG. 1 illustrates the system 100 including the plurality of nodes 113 (e.g., a cluster of network devices) within the network 110. The network 110 may include a computing network. The network 110 may include computing network for data communication. In some examples, the system 100 may include a wireless computing network for wireless data communication. In some examples, the network 110 of the system 100 may be a wireless local area network (WLAN) for data communication.

The network 110 may include interconnected network devices (e.g., the nodes 113) that operate to communicate and/or manage the communication of data traffic on the network 110. The network 110 may include a clustered computing network. For example, the network 110 may include multiple APs and multiple controllers. For example, a plurality of controllers may be utilized to manage the data communication from and to a plurality of APs. In these examples, the central controller 104 may be utilized to manage the activities of the other controllers of the plurality of controllers within the network 110.

Client devices may access the network 110 by communicating with an AP 114, 115, and/or 116. The controllers included in the nodes 113 may manage the communication of the client devices to the AP 114, 115, and/or 116. In some examples, the controllers may manage which AP of a plurality of APs 114, 115, and/or 116) in the network 110 that a particular client device may communicate with.

The client devices may engage in a session on the network 110. For example, the client devices engage in a session including the interchange of data with other computing devices (e.g., network devices on the same network, network devices on another network connected to the network, a server on the network, a server on another network connected to the network, another client device on the same network, another client device on another network connected to the network, etc.). The session may include an interactive exchange of data packets between the client device, the APs, a controller, and/or other network devices. The data interchange of the client devices engaged in a session on the network 110 may be interrupted during a network upgrade. The system 100 may include the central controller 104 which may monitor the network parameters 112 and manage the upgrade to the network 110. The central controller 104 may include instructions executable by a processing resource 106 to perform various functions relating to network upgrades. To avoid network disruption, the central controller 104 may execute instructions to analyze network parameters 112 in the network 110 over a period of time.

For example, the central controller 104 may determine a plurality of time intervals based on an upgrade to be applied to the network 110. As used herein, the term "time interval" refers to an amount of time that the central controller 104 has determined the network parameters 112 to be at or below the threshold. For example, a time interval may be an amount of time to complete the upgrade to a plurality of nodes 113 on the network 110 and/or the interval of time at which the central controller 104 determines the network parameters 112 to be at or under the determined threshold. In some examples, the central controller 104 may determine the time intervals by monitoring the network parameters 112 of the network 110 for a period of time.

For example, the central controller 104 may determine the time interval for the network parameters 112 in which an upgrade may be applied to the cluster of network devices (e.g., the nodes 113). In some examples, the central controller 104 may determine the time interval to apply the upgrade by analyzing each of the network parameters 112 as a variable as described below.

$$h_\theta(x) = \theta_0 + (\theta_1 * x_1) + (\theta_2 * x_2) + (\theta_3 * x_3) + \ldots \quad \text{Equation 1.}$$

Where θ is a constant related to the time in which the analysis is occurring and $x_1$, $x_2$, $x_3$ . . . each refer to a network parameter 112 and $h_\theta(x)$ corresponds to a time interval.

For example, the central controller 104 may collect data about the network parameters 112 for a period of time for one month, and equation 1 may be applied to the collected network parameters 112 to determine the level of activity of the nodes 113 at multiple time intervals during that period of time of one month. The network parameters during the time intervals may be analyzed to determine when the network parameters 112 are relatively low. The central controller 104 may identify the when the network parameters 112 are relatively low and determine the network parameters 112 at that time interval to be the threshold corresponding to a relatively low level of activity. The central controller 104 may determine that an upgrade may be applied to the nodes 113 at a particular time interval based on the collected data and the network upgrade may be applied to the nodes 113 when the network parameters 112 are at or below the threshold at the determined time interval. In contrast, the central controller 104 may refrain from initiating the upgrade to the nodes 113 during the selected time interval if the network parameters 112 are above the determined threshold. In this way, the central controller 104 may determine a time interval to initiate an upgrade based on multiple network parameters 112 being at a relatively low level of activity and check that the level of network parameters 112 is below the threshold as predicted. Further, the multiple network parameters 112 analyzed may permit a cluster of network devices (e.g., the nodes 113) to be upgraded in a live condition without the loss of network access as the network 110 may remain operational during the upgrade.

In another example, the central controller 104 may collect data about the network parameters 112 of the network 110 for five minutes of each hour for one month. The central controller 104 may store this data in a historical database. While specific examples of time are discussed herein (e.g., 5 minutes, hour, month, etc.) other quantities of time are contemplated and may be more or less than the specific examples discussed herein. As mentioned, a threshold may be determined by comparing the historical data from the network parameters 112. The central controller 104 may determine, based on the historical data, that the network parameters 112 are below the determined threshold at a particular time interval. For example, the central controller 104 may identify a pattern of the network parameters 112 over the period of time of one month where the pattern is based on the network parameters 112 being at or below the determined threshold. As such, historical data about the network parameters 112 in the network 110 over a monitoring period of time may be stored by and/or accessible to the central controller 104. The central controller 104 may analyze the network parameters 112 in the network 110 (e.g., in real time and/or historical data). That is, the central controller 104 may analyze the stored historical network parameters 112 from the monitoring period of time. For example, the central controller 104 may predict that the network parameters 112 may be below the determined threshold on a Sunday at 3 AM-4 AM based on the stored historic data and schedule an upgrade to be automatically initiated when the network parameters 112 fall below the determined threshold during that predicted time interval. In other words, the central controller 104 may schedule an upgrade during a time interval of predicted low activity, and the upgrade may be initiated when the network parameters 112 are at or below the threshold during the scheduled time interval. In this way, the central controller 104 may avoid initiating an upgrade in the instance that the network parameters 112 are relatively high during the scheduled time interval when the network parameters 112 are predicted to be relatively low.

An upgrade to be applied to the network 110 may be determined to take one hour, thus the central controller 104 may determine a time interval where the network parameters 112 are below the determined threshold for one hour. In other words, the central controller 104 may determine an upgrade to be applied to a plurality of network devices (e.g., the nodes 113) on the network 110 and select a time interval where the network parameters 112 may be below the determined threshold for one hour. Using the data driven approach of monitoring multiple metrics of the network parameters 112, the central controller 104 may initiate the upgrade when the network parameters 112 are at or below the determined threshold during a time interval where the upgrade may be completed.

As described above, clusters of network devices such as the nodes 113 on the network 110 may be upgraded. Specifically, the nodes 113 on the network 110 may be updated. For example, a new firmware image, operating system image, security update, configuration settings may be applied to network devices and/or client devices through network devices with an upgrade. As described above, the upgrade may take an amount of time to perform. The amount of time that the upgrade takes to perform may be quantified by the amount of time that it takes to retrieve the new image, communicate the new image to the target network device, apply the new image to the target network device, and/or restart or bring the target network device back to an operational state after applying the new image. In some examples, the amount of time that the upgrade takes may be quantified by the amount of time that the network 110 and/or the constituent network devices of the network 110 may have their network functionality discontinued and/or retarded while the upgrade is being retrieved and/or applied in the network 110. For example, each time interval of the plurality of time intervals may correspond to the network parameters 112 being below the determined threshold for a particular amount of time based on the upgrade. While the plurality of time intervals and the amount of time for an upgrade may be described herein as one hour, the amount of time may be more or less than one hour.

As described above, the central controller 104 may identify when the network parameters 112 of the nodes 113 on the network 110 are below the determined threshold (e.g., determined at equation 1 above). For example, the central controller 104 may determine that the network parameters 112 are below the determined threshold, thus, the activity of the devices operating on the network 110 may be relatively low such that an upgrade may be applied to the network 110 with minimal disruption to the devices operating on the network 110. In contrast, applying an upgrade when the network parameters 112 are determined to be above the determined threshold, may cause more disruption to the devices operating on the network 110.

In some examples, the central controller 104 may execute instructions to initiate the upgrade to the network 110 when the network parameters 112 are below the determined threshold during a selected time interval of a plurality of time intervals. The selected time interval may be a time interval when the network parameters 112 have been historically low. For example, the central controller 104 may automatically initiate the upgrade when the network parameters 112 of the network 110 are below the determined threshold during the selected time interval. In other examples, a network administrator may initiate the upgrade to the network 110 based on the determination by the central controller 104 that the network parameters 112 are below the determined threshold during the selected time interval.

As mentioned herein, the network parameters 112 may include multiple metrics of the network 110. For example, the central controller 104 may analyze the network parameters 112 to determine the network parameters 112 utilizing the network 110 during each of the plurality of time intervals. For example, the central controller 104 may monitor the network 110 and detect, determine, collect, and/or record network parameters 112. In some examples, a network device such as a controller or an AP may detect, determine, collect, and/or record an amount of network parameters 112. An amount of network parameters 112 may include a quantity of clients utilizing the network 110, a network traffic pattern of a plurality of nodes within the network 110, a quantity of applications (e.g., RTP, and FTP) utilized by a plurality of nodes within the network 110, a load distribution of a plurality of nodes within the network 110, and/or a percentage of CPU utilized by a plurality of nodes within the network 110. In this way, multiple metrics may be monitored by the central controller 104 to determine a time interval to perform an upgrade that may have a relatively low impact on network device devices operating on the network 110. In some examples, the central controller 104 may initiate an upgrade on a particular AP operating on the network 110.

For example, the central controller 104 may initiate the upgrade on an AP operating on the network 110 when the network parameters 112 operating on the AP are below the determined threshold. In some examples, the central controller 104 may initiate the upgrade on a first AP instead of a second AP operating on the network 110 based on the network parameters 112 operating on the respective APs.

For example, the central controller 104 may determine the network parameters 112 of a first AP operating on the network 110 and the network parameters 112 of a second AP to determine that the first AP has lower network parameters 112 than the second AP. In this example, the central controller 104 may determine that the network parameters 112 of the first AP are below the determined threshold, the central controller 104 may initiate the upgrade to the first AP and refrain from initiating the upgrade on the second AP.

Examples associated with FIG. 1 describe network upgrades that may be initiated on network devices (e.g., a cluster of network devices, the nodes 113, etc.) that are operating on a network 110. A central controller 104 may monitor the network parameters 112 of the nodes 113 on the network 110 to determine a time interval to apply the upgrade which may cause the least amount of interruption to the network devices that are operating on the network 110. The central controller 104 monitoring the network parameters 112 may alleviate error and assumption that may be made by manual determination of the network parameters 112. In other words, instead of a network administrator attempting to analyze multiple network parameters 112, the central controller 104 may monitor the network parameters 112 at a selected time interval and identify whether the network parameters 112 are at or below a determined threshold and perform an upgrade at the selected time interval where an amount and/or type of data traffic in the network 110 may be at a relative minimum.

Figure 2:
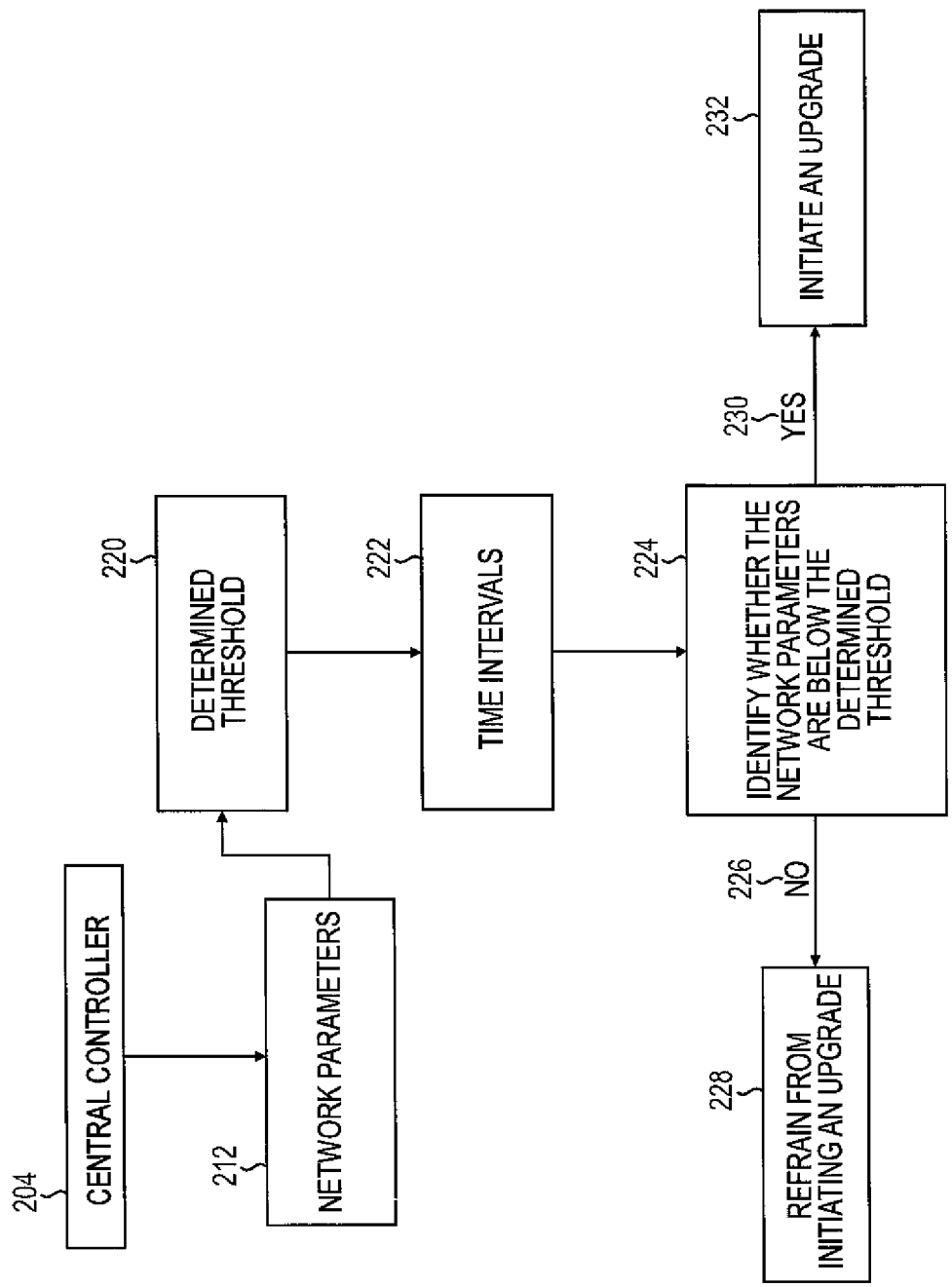
FIG. 2 illustrates an example flow diagram of network upgrades consistent with the disclosure.

FIG. 2 illustrates an example flow diagram of network upgrades consistent with the disclosure. As shown in FIG. 2, at block 204, a central controller (e.g., the central controller 104 of FIG. 1) may monitor a network (e.g., the network 110 of FIG. 1) to collect metrics relating to the operations of network devices (e.g., the nodes 113 of FIG. 1) included on the network. Specifically, at block 212, the central controller may monitor the network for network parameters (e.g., the network parameters 112 of FIG. 1). The central controller may monitor multiple metrics of the network parameters operating on the network to determine when an upgrade to the network may be applied. To avoid disruption to the network and devices operating on the network, the central controller may determine a level of activity of the devices based on monitoring the network parameters.

For example, at block 220, the central controller may determine a threshold of operations based on the network parameters. Specifically, the central controller may analyze the monitored network parameters at multiple time intervals during a period of time (e.g., one month) to determine when the metrics of the network are low relative to other instances when the activities of the network are relatively high. For example, the central controller may determine based on the multiple metrics of the network parameters when the network is not being frequently utilized, thus determining a threshold. The controller may use the determined threshold to check the network parameters before initiating an upgrade during a selected time interval. The determined threshold may indicate that the central controller may initiate an upgrade without causing a disruption to the devices operating on the network. In some examples, the central controller may determine a plurality of time intervals indicating when an upgrade may be initiated based, and/or based on the upgrade to be applied to the network.

For example, at block 222, the central controller may determine a plurality of time intervals during which an upgrade may be applied to the network. In some examples, the plurality of time intervals may be based on the network parameters being historically at or below the determined threshold. For example, the plurality of time intervals may be determined from a historic record stored by the central controller. In other words, the central controller may monitor the network parameters of a network each day for a month, and based on the monitored network parameters, determine a pattern of when the network is operating at or below the determined threshold. In other examples, the central controller may determine a plurality of time intervals based on the upgrade to be applied to the network. For example, the central controller may determine that the upgrade may take one hour to complete, thus, the central controller may determine the plurality of time intervals based on incidences when the network parameters are at or below the determined threshold for an amount of time sufficient to complete the upgrade. In other words, the central controller may determine a plurality of time intervals based the network parameters of a network to which an upgrade may be initiated during a particular time interval of the plurality of time intervals.

In some examples, the central controller may initiate an upgrade to a network based on a determination that the network parameters of the network are at or below the determined threshold during the time interval. For example, the central controller may check to determine that an upgrade may be applied to a network, thus at block 224, the central controller may identify whether the network parameters are below the determined threshold during a time interval of the plurality of time intervals. When the central controller determines that the network parameters are not below the determined threshold ("no" at block 226), the central controller may refrain from initiating the upgrade to the network at block 228 during the time interval. In other examples, the central controller may initiate the upgrade when the monitored network parameters are below the determined threshold.

For example, the central controller may check to determine that an upgrade may be applied to a network, thus at block 224, the central controller may identify whether the network parameters are below the determined threshold during a time interval of the plurality of time intervals. When the central controller determines that the network parameters are below the determined threshold ("yes" at block 230), the central controller may initiate the upgrade to the network at block 232 during the time interval. For example, the central controller may automatically initiate the upgrade when the network parameters of the network are below the determined threshold. In other examples, a network administrator may initiate the upgrade to the network based on the determination by the central controller that the network parameters are below the determined threshold. In another example, the controller may schedule an upgrade to be applied to the network during one of the plurality of time intervals based on historic data about the network parameters and the central controller may check the network parameters at the scheduled time interval to initiate the upgrade when the network parameters are below the threshold.

Examples associated with FIG. 2 describe network upgrades that may be initiated on network devices that may be operating on a network. A central controller may monitor multiple network parameters of a network to determine a time interval to apply the upgrade which may cause the least amount of interruption to the devices that are operating on the network. The central controller monitoring the network parameters may alleviate error and assumption that may be made by manual determination of the network parameters. In other words, instead of a network administrator attempting to analyze multiple network parameters, the central controller may monitor the network parameters and identify whether the network parameters are below a determined threshold and performing an upgrade at a time where an amount and/or type of data traffic in the network may be at a relative minimum.

Figure 3:
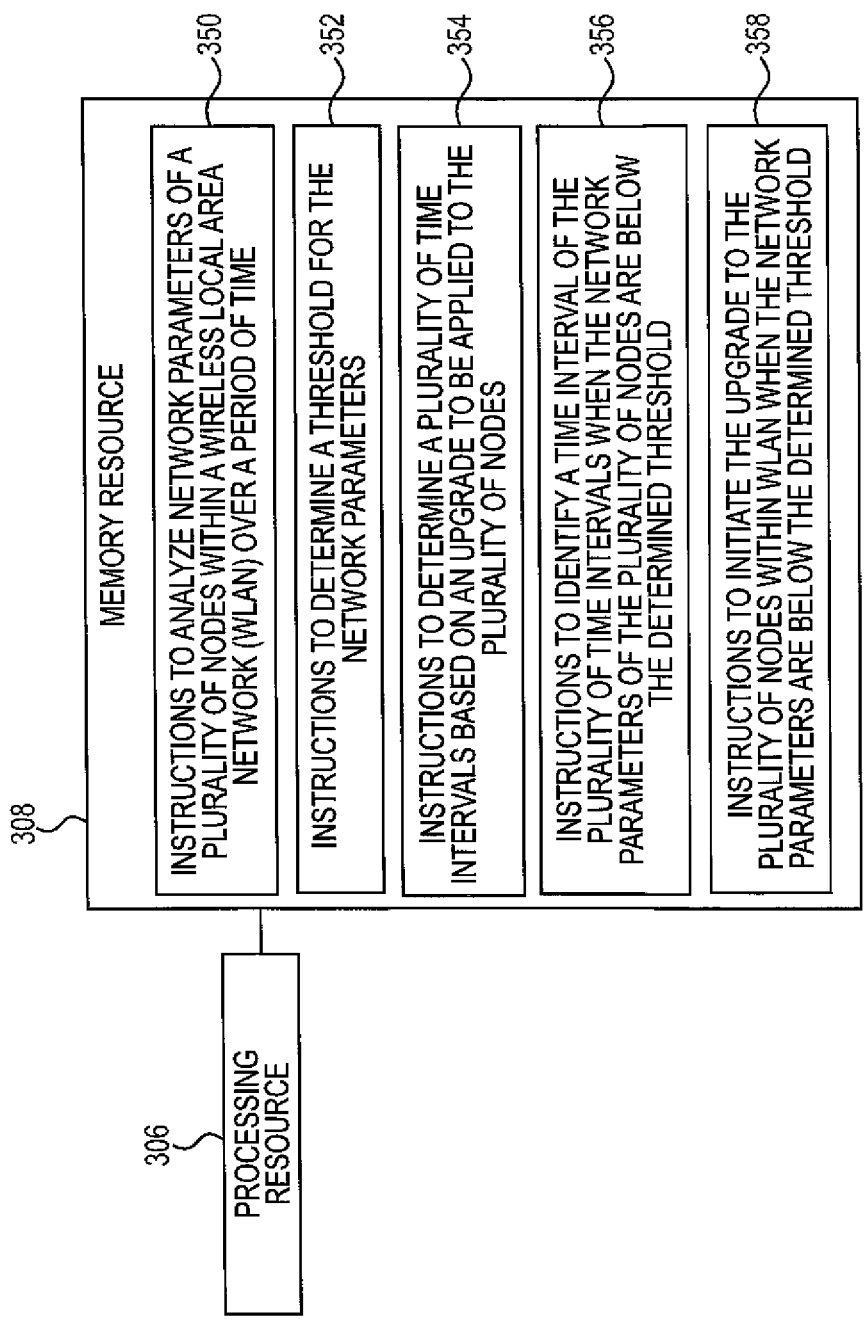
FIG. 3 illustrates an example processing resource and an example memory resource consistent with the present disclosure.

FIG. 3 illustrates an example processing resource and an example memory resource consistent with the present disclosure. The processing resource 306 and the memory resource 308 may be included in a controller (e.g., the central controller 104 of FIG. 1). The processing resource 306 may be a hardware processing unit such as a microprocessor, microcontroller, application specific instruction set processor, coprocessor, network processor, or similar hardware circuitry that may cause machine-readable instructions to be executed. In some examples, the processing resource 306 may be a plurality of hardware processing units that may cause machine-readable instructions to be executed. The processing resource 306 may include central processing units (CPUs) among other types of processing units. The memory resource 308 may be any type of volatile or non-volatile memory or storage, such as random-access memory (RAM), flash memory, read-only memory (ROM), storage volumes, a hard disk, or a combination thereof.

The memory resource 308 may store instructions thereon, such as instructions 350, 352, 354, 356, and 358. When executed by the processing resource 306, the instructions may cause the controller to perform specific tasks and/or functions. For example, the memory resource 308 may store instructions 350 which may be executed by the processing resource 306 to cause the controller to analyze network parameters (e.g., the network parameters 112 of FIG. 1) of a plurality of nodes (e.g., the nodes 113 of FIG. 1) within a wireless local area network (WLAN) (e.g., the network 110 of FIG. 1) over a period of time. As mentioned herein, the plurality of nodes may include controllers with a plurality of APs communicatively connected to the controller included in the node. In some examples, the controller may analyze the network parameters of a network for a period of time to determine when the network parameters of the plurality of nodes are low relative to when there is a relatively high amount of activity on the plurality of nodes.

For example, the memory resource 308 may store instructions 352 which may be executed by the processing resource 306 to cause the controller to determine a threshold for the network parameters. In other words, the threshold may be representative of a quantity of the multiple metrics of the network parameters operating on the plurality of nodes of the WLAN. The threshold may be determined by monitoring the network parameters during multiple time intervals during a period of time and the threshold may be when the network parameters are relatively low. The quantity of network parameters below the threshold may correspond to a relatively low level of activity and a quantity of network parameters above the determined threshold may correspond to a level of relatively high activity of the network parameters. The controller may identify that an upgrade may be applied to the plurality of nodes on the WLAN and may utilize the determined threshold to refrain from causing interruption to the WLAN.

For example, the memory resource 308 may store instructions 354 which may be executed by the processing resource 306 to cause the controller to determine a plurality of time intervals based on an upgrade to be applied to the plurality of nodes. For example, from the analysis of the network parameters the controller may determine a plurality of time intervals where the network parameters are at or below the determined threshold. In this way, the controller may determine when the upgrade may be applied to the WLAN to avoid network disruption.

For example, the memory resource 308 may store instructions 356 which may be executed by the processing resource 306 to cause the controller to identify a time interval of the plurality of time intervals when the network parameters of the plurality of nodes are below the determined threshold. In some examples, the controller may determine that the identified time interval is sufficient to complete the upgrade without causing network disruption. For example, an upgrade may take an hour to complete, thus the controller may identify a time interval of the plurality of time intervals where the network parameters are relatively low (e.g., below the determined threshold) for an hour. The controller may initiate the upgrade to the WLAN during the selected time interval.

For example, the memory resource 308 may store instructions 358 which may be executed by the processing resource 306 to cause the controller to initiate the upgrade to the plurality of nodes within WLAN when the network parameters are below the determined threshold, where the upgrade is performed during the time interval. For example, the controller may automatically initiate the upgrade when the network parameters of the WLAN are below the determined threshold. In other examples, a network administrator may initiate the upgrade to the WLAN based on the determination by the controller that the network parameters are below the determined threshold. In another example, the controller may schedule an upgrade to be applied to the WLAN during one of the plurality of time intervals based on historic data about the network parameters and the controller may check the network parameters at the scheduled time interval to initiate the upgrade when the network parameters are below the threshold.

Examples associated with FIG. 3 describe network upgrades that may be initiated on network devices that may be operating on a network. The controller may analyze multiple network parameters of a plurality of nodes within WLAN. In this way, instead of a network administrator attempting to analyze multiple network parameters, the controller may monitor the network parameters and identify whether the network parameters are below a determined threshold and performing an upgrade at a time where an amount and/or type of data traffic in the network may be at a relative minimum.

Figure 4:
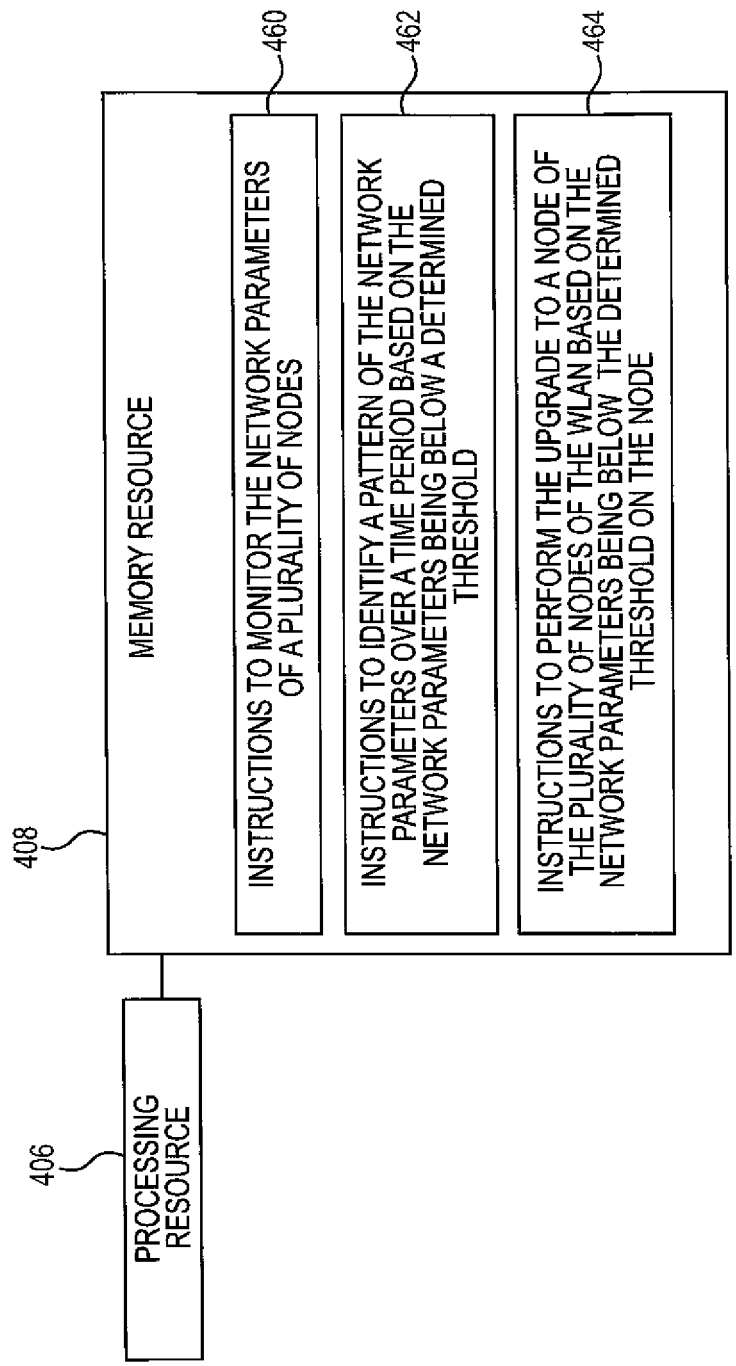
FIG. 4 illustrates an example processing resource and an example memory resource consistent with the present disclosure.

FIG. 4 illustrates an example processing resource and an example memory resource consistent with the present disclosure. A processing resource 406 may execute instructions stored on the non-transitory machine readable medium 408. The non-transitory machine readable medium 408 may be any type of volatile or non-volatile memory or storage, such as random-access memory (RAM), flash memory, read-only memory (ROM), storage volumes, a hard disk, or a combination thereof.

The medium 408 stores instructions 460 executable by a processing resource to monitor the network parameters of a plurality of nodes. For example, the controller may collect data from the network parameters of a plurality of nodes operating on a WLAN over a period of time (e.g., one month). The controller may analyze the data monitored from the network parameters and determine a threshold.

For example, the memory resource 408 may store instructions 462 which may be executed by the processing resource 406 to identify a pattern of the network parameters over the period of time (e.g., one month) based on the network parameters being below the determined threshold. The controller may store the pattern as historical data of the network parameters of a plurality of nodes (e.g., the nodes 113 of FIG. 1) on the network. As such, the historical data about the network parameters in the network over a monitoring period of time may be stored by and/or accessible to the controller. The controller may analyze the network parameters on the network (e.g., in real time and/or historical data). That is, the controller may analyze the stored historical network parameters from the monitoring period of time. For example, based on the identified pattern, the controller may predict that the network parameters may be below the determined threshold on a Sunday at 3 AM-4 AM (e.g., a time interval) based on the stored historic data and schedule an upgrade to be automatically initiated when the network parameters fall below the determined threshold during that predicted time interval. In this way, the controller may determine a time interval based on the upgrade to be completed on the network. In some examples, the controller may initiate the upgrade to a node (e.g., an AP and/or a controller connected to an AP) operating on the WLAN.

For example, the memory resource 408 may store instructions 464 which may be executed by the processing resource 406 to perform the upgrade to a node of the plurality of nodes of the WLAN based on the network parameters being below the determined threshold on the node. In some examples, the controller may refrain from initiating the upgrade to a node. For example, the controller may determine the network parameters of a first node within the WLAN to the network parameters of a second node to determine that the first node has lower network parameters than the second node. In this example, if the controller determines that the network parameters of the first node are below the determined threshold, the controller may initiate the upgrade to the first node and refrain from initiating the upgrade on the second node.

Examples associated with FIG. 4 describe network upgrades that may be initiated on network devices that may be operating on a network. The controller may analyze multiple network parameters of a plurality of nodes within WLAN. In this way, instead of a network administrator attempting to analyze multiple network parameters, the controller may monitor the network parameters and identify whether the network parameters are below a determined threshold and performing an upgrade at a time where an amount and/or type of data traffic in the network may be at a relative minimum.

Figure 5:
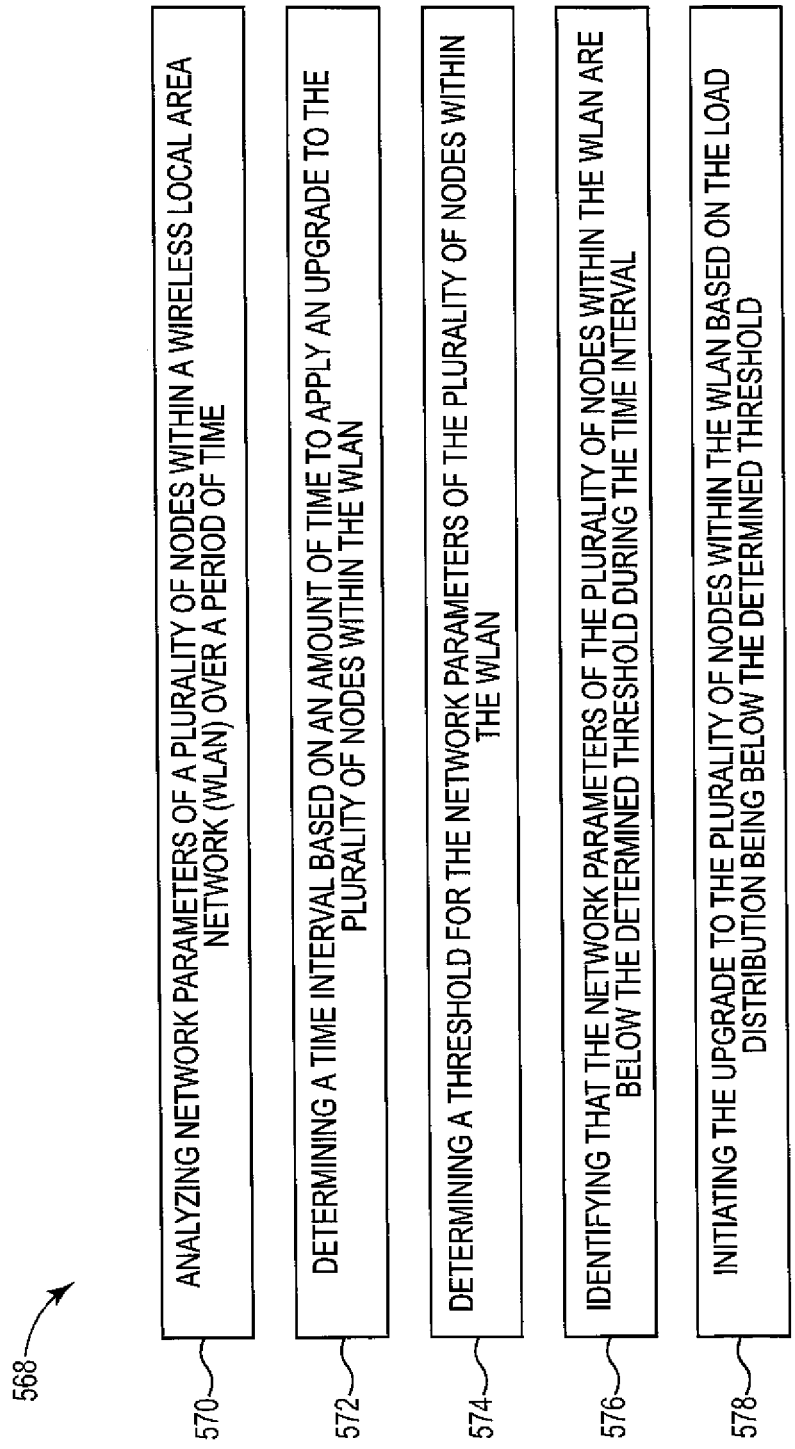
FIG. 5 illustrates a diagram of an example of a method for network upgrades consistent with the disclosure.

FIG. 5 illustrates a diagram of an example of an example method 568 for network upgrades consistent with the disclosure. A controller (e.g., the central controller 104 of FIG. 1) may have functionality including monitoring network parameters (e.g., the network parameters 112 of FIG. 1) at each of a plurality of nodes to determine the network parameters of a node of the plurality of nodes (e.g., the nodes 113 of FIG. 1) within a WLAN (e.g., the network 110 of FIG. 1). For example, at 570, the method 568 may include the controller analyzing the network parameters of the plurality of nodes within the WLAN over a period of time.

For example, the controller may collect data from the network parameters such that the controller may analyze the activity of the plurality of nodes in the WLAN.

For example, at 572, the method 568 may include the controller determining a time interval based on an amount of time to apply an upgrade to the plurality of nodes within the WLAN. For example, the controller may determine that an upgrade is available to a plurality of nodes included in a WLAN. The controller may further determine that the upgrade may take one hour to complete, thus, the controller may identify a plurality of time intervals that are sufficient to complete the upgrade to the plurality of nodes in the WLAN. The controller may further determine the time interval to be a time where the network parameters are at a relative low, and thus less susceptible to network disruption.

For example, at 574, the method 568 may include the controller determining a threshold for the network parameters of the plurality of nodes within he WLAN. The threshold may be determined by monitoring the network parameters during multiple time intervals during a period of time and the threshold may be when the network parameters are relatively low. For example, the controller may determine when the metrics of the network parameters collected during the period of time are at a relative low, thus indicating that the network is not operating to transmit and receive data. Thus, an upgrade may be applied to the plurality of nodes without significant disruption to the WLAN. For example, at 576, the method 568 may include the controller identifying that the network parameters of the plurality of nodes within the WLAN are below the determined threshold during the identified time interval. The controller may further initiate the upgrade during the identified time interval.

For example, at 578, the method 568 may include the controller initiating the upgrade to the plurality of nodes within the WLAN based on a load distribution being below the determined threshold. For example, the controller may automatically initiate the upgrade when the network parameters of the plurality of nodes within the WLAN are below the determined threshold. In other examples, a network administrator may initiate the upgrade to the plurality of nodes within the WLAN based on the determination by the controller that the network parameters are below the determined threshold. In another example, the controller may schedule an upgrade to be applied to the plurality of nodes within the WLAN during one of the plurality of time intervals based on historic data about the network parameters and the controller may check the network parameters at the scheduled time interval to initiate the upgrade when the network parameters are below the threshold.

Examples associated with FIG. 5 describe network upgrades that may be initiated on network devices that may be operating on a network. A controller may monitor multiple network parameters of a network to determine a time interval to apply the upgrade which may cause the least amount of interruption to the devices that are operating on the network. The controller monitoring the network parameters may alleviate error and assumption that may be made by manual determination of the network parameters. In other words, instead of a network administrator attempting to analyze multiple network parameters, the controller may monitor the network parameters and identify whether the network parameters are below a determined threshold and performing an upgrade at a time where an amount and/or type of data traffic in the network may be at a relative minimum.

What is claimed:

1. A system comprising:
a controller to monitor network parameters in a wireless local area network (WLAN), the controller comprising:
a processing resource; and
a memory resource comprising instructions executable by the processing resource to:
analyze network parameters in the WLAN over a period of time;
determine a threshold for the network parameters;
determine a plurality of time intervals based on an upgrade to be applied to the WLAN;
determine network parameters of a first node of the plurality of nodes and the network parameters of a second node of the plurality of nodes to determine that the first node has lower network parameters than the second node;
identify when the network parameters of the first node of the plurality of nodes are below the determined threshold; and
initiate the upgrade of the first node of the plurality of nodes when the network parameters are below the determined threshold, wherein the upgrade is performed during one of the plurality of time intervals.

2. The system of claim 1, wherein the instructions to initiate the upgrade are performed on a cluster of network devices of the WLAN when the network parameters operating on the cluster of network devices are below the determined threshold.

3. The system of claim 1, wherein the instructions to analyze the network parameters in the WLAN include instructions to:
determine a quantity of clients utilizing the WLAN during each of the plurality of time intervals.

4. The system of claim 1, wherein the instructions to analyze the network parameters in the WLAN include instructions to:
determine a network traffic pattern of a plurality of nodes within the WLAN during each of the plurality of time intervals.

5. The system of claim 1, wherein the instructions to analyze the network parameters in the WLAN include instructions to:
determine a quantity of applications utilized by a plurality of nodes within the WLAN during each of the plurality of time intervals.

6. The system of claim 5, wherein the applications are one of real-time transport protocol (RTP), file transfer protocol (FTP), or combinations thereof.

7. The system of claim 1, wherein the instructions to analyze the network parameters in the WLAN include instructions to:
determine a load distribution of a plurality of nodes within the WLAN during each of the plurality of time intervals.

8. The system of claim 1, wherein the instructions to analyze the network parameters in the WLAN include instructions to:
determine a percentage of central processing units (CPU) utilized by a plurality of nodes within the WLAN.

9. The system of claim 1, wherein each time interval of the plurality of time intervals corresponds to the network parameters being below the determined threshold for an amount of time based on the upgrade.

10. A non-transitory machine-readable medium storing instructions executable by a processing resource to:
analyze network parameters of a plurality of nodes within a wireless local area network (WLAN) over a period of time;
determine a threshold for the network parameters;
determine a plurality of time intervals based on an upgrade to be applied to the plurality of nodes;
determine network parameters of a first node of the plurality of nodes and the network parameters of a second node of the plurality of nodes to determine that the first node has lower network parameters than the second node;
identify a time interval of the plurality of time intervals when the network parameters of the first node of the plurality of nodes are below the determined threshold; and
initiate the upgrade to the first node of the plurality of nodes within WLAN when the network parameters are below the determined threshold, wherein the upgrade is performed during the time interval.

11. The medium of claim 10, comprising instructions executable by the processing resource to identify a pattern of the network parameters over the period of time based on the network parameters being below the determined threshold.

12. The medium of claim 10, wherein the time interval is an amount of time to complete the upgrade to the plurality of nodes within the WLAN.

13. The medium of claim 10, comprising instructions executable by the processing resource to:
monitor the network parameters of the plurality of nodes; and
perform the upgrade to a node of the plurality of nodes of the WLAN based on the network parameters being below the determined threshold on the node.

14. The medium of claim 10, wherein the network parameters include multiple metrics corresponding to each node of the plurality of nodes within the WLAN.

15. The medium of claim 14, comprising instructions executable by the processing resource to determine the threshold based on a value of the multiple metrics, wherein each of the multiple metrics correspond to a different value.

16. A method comprising:
analyzing network parameters of a plurality of nodes within a wireless local area network (WLAN) over a period of time;
determining a time interval based on an amount of time to apply an upgrade to the plurality of nodes within the WLAN;

determining a threshold for the network parameters of the plurality of nodes within the WLAN;

determining network parameters of a first node of the plurality of nodes and the network parameters of a second node of the plurality of nodes to determine that the first node has lower network parameters than the second node, wherein the network parameters of the first node are below the determined threshold;

initiating the upgrade on the first node and refraining from performing the upgrade on the second node.

17. The method of claim 16, comprising monitoring the network parameters at each of the plurality of nodes to determine the network parameters of a node of the plurality of nodes within the WLAN.

18. The method of claim 16, comprising refraining from initiating the upgrade to the plurality of nodes within the WLAN based on the network parameters being above the determined threshold.

* * * * *